INVENTOR
WILLIAM D. WILKERSON
BY
SMYTH, ROSTON & PAVITT
ATTORNEYS

June 17, 1969 W. D. WILKERSON 3,450,375
LOAD FEEL COMPUTER
Filed Feb. 2, 1967 Sheet 3 of 3

INVENTOR
WILLIAM D. WILKERSON
BY
SMYTH, ROSTON & PAVITT
ATTORNEYS

United States Patent Office 3,450,375
Patented June 17, 1969

3,450,375
LOAD FEEL COMPUTER
William D. Wilkerson, Santa Ana, Calif., assignor to Bertea Corporation, Irvine, Calif., a corporation of California
Filed Feb. 2, 1967, Ser. No. 613,581
Int. Cl. B64c 13/50
U.S. Cl. 244—77                     8 Claims

ABSTRACT OF THE DISCLOSURE

This disclosure describes a system for electrically controlling an electrohydraulic valve. The electrical system for providing this control function includes several devices, such as transducers, each of which produces an electrical signal in response to a predetermined variable condition. The several electrical signals are combined in a gain programmer according to a predetermined program to produce a control signal which controls the electrohydraulic valve. The electrohydraulic valve controls the force required for operating a control surface actuator. Two such systems are arranged with a monitor to indicate failure of either one.

Background of the invention

This invention relates to a novel system for producing a controlled fluid output variable in response to one or more inputs. This system is particularly adapted for use as a load feel computer for airborne vehicles, but it will be readily apparent to those skilled in the art that the system of this invention has numerous other applications.

As is well known, airborne vehicles have numerous movable control surfaces, such as stabilizers, ailerons, elevators, etc., which are movable to change the direction of movement of the aircraft when it is aloft. When the pilot wishes to change the direction of movement of the aircraft, he moves the appropriate actuator within the cockpit. This actuates a power-driven mechanism which causes the desired movement of the control surface. Thus, the control surface is moved by power-operated means and the pilot need only actuate the appropriate power system to achieve the desired directional control.

One disadvantage with this system is that the pilot loses "feel" of the control system. That is, the control surfaces are all easily movable under virtually all flight conditions because they are power driven. The primary purpose of load feel computers is to put "feel" back into the control system so that the force required on the part of the pilot to operate the approproiate controlling actuator will vary depending upon certain flight conditions.

Various flight conditions, such as air speed, acceleration and control surface position may be used to cause variations in the force required to operate the actuator. Frequently, the air speed of the aircraft and the position of the particular control surface and/or related control surfaces are utilized. Usually the load feel computer is used to produce an output which varies in response to the aircraft speed and the position of the particular control surface, the movements of which are being controlled.

Prior art load feel computers utilize relatively heavy mechanical mechanisms or mechanical and hydraulic devices. These mechanical mechanisms often include a cam in response to variations in one of the flight conditions. The cam contour must be carefully machined to produce the desired output. The mechanical device produces an output which resists actuator movement when the pilot attempts to move same.

A primary disadvantage of these prior art devices is that they are not as reliable as desired. In particular, they utilize relatively low air pressure to measure the air speed, but must deliver a relatively high pressure output. This necessity for a high gain across the device reduces the stability and reliability thereof to an undesirable degree.

Another primary disadvantage of these prior art mechanical devices is that they do not produce an output which corresponds as closely as desired to the required output. One reason for this is that it is difficult or impossible to construct the cams which perform the appropriate functions as accurately as necessary.

Such prior art devices, being primarily mechanical and constructed largely of metal, add considerable weight to the aircraft. The mechanical systems of the prior art are relatively complex, expensive, and cams thereof must be accurately machined. It is also difficult to alter the function of the prior art devices in that for each change of function a new cam, bellows, linkage or other device must be fabricated.

Summary of the invention

According to the present invention, reliability of fluid control systems generally and of load feel computers in particular are substantially increased. This significant advantage is obtained even though the weight, cost and complexity of the device are reduced.

These advantages are obtainable by eliminating the complex cams and mechanical mechanisms of the prior art and utilizing an electrohydraulic system to produce an output which resists movement of the actuator by the pilot. Preferably, the electrical system produces a control signal which controls fluid or mechanical means which interpose a predetermined resistance to actuator movement.

A load feel computer constructed in accordance with the teachings of this invention may include means for producing a first electrical signal variable in response to a first flight condition and means for producing a second electrical signal variable in response to a second flight condition. A gain programmer is provided for combining the first and second electrical signals in a predetermined manner to produce an electrical control signal. Resistance control means operate in response to the control signal to vary the force required for operating the actuator.

As indicated hereinabove, any desired flight condition may be converted into an electrical signal so that the force required for operating the actuator can be varied as a function thereof. In a preferred embodiment of this invention a surface position transducer is utilized to produce the first electrical signal in response to the angular position of the particular control surface which is being controlled and/or related control surfaces. A ram air pressure transducer is utilized to produce the second electrical signal which is a function of the air speed of the airplane. Thus, the second electrical signal varies in response to changes in the air speed of the aircraft.

Various types of transducers may be employed with this invention. It is preferred, however, to utilize transducers having a linear output. Because of its low cost, low weight and high degree of accuracy, it is preferred to use a strain gauge type ram air transducer.

The electrical signals produced by the transducer are fed to the gain programmer which produces a control signal in response thereto. In general, the gain programmer provides an electrical control signal and varies that control signal in dependence upon one of its inputs, such as the signal from the ram air pressure transducer which represents the flight speed and in accordance with a particular characteristic. The second input or further inputs are then used to modify that characteristic. The gain programmer is thus a normal analog computer utilizing nonlinear characteristics of its component to establish variable attenuation, nonlinear cutoff points, variable feedback, or variable excitation of the transducers employed. In the general case, the gain programmer will include means for providing at least one nonlinear function of at least one of its inputs, which nonlinearities may include gain changes, gain limitations, step functions, etc.

The control signal from the gain programmer is amplified and fed to an electrohydraulic valve. The electrohydraulic valve controls the flow of an operating fluid to and from an actuator resistance control. The resistance to actuator movement depends upon the pressure of the operating fluid that the electrohydraulic valve permits to act on the actuator resistance control. Thus, one important feature of this invention is the control of the electrohydraulic valve by the gain programmer.

To improve the accuracy of the electrohydraulic valve, a feedback system is utilized. Such feedback system may include a pressure feedback transducer responsive to the difference between supply and return pressures to the actuator resistance control to produce an electrical feedback signal. This electrical feedback signal is summed with the control signal and supplied as an input to the electrohydraulic valve. Thus, the feedback system acts to cancel out variations in operating fluid supply pressure to the valve.

Because of the importance of proper actuation of the control surfaces, it is usually considered desirable to employ two separate and substantially identical systems, each of which is capable independently of controlling the various control surfaces. In order to inform the pilot when one of these systems is not functioning properly, a monitor is provided. This monitor compares the feedback signals from the two pressure feedback transducers of the two systems and energizes an indicator, such as an indicator light, in the event that one of the systems malfunctions. It is important that the monitor perform a comparing function rather than merely separately measuring the magnitude of each feedback signal because a high individual magnitude of one feedback signal is not necessarily indicative of a failure.

The invention, both as to its organization and method of operation, together with further features and advantages thereof, may best be understood by reference to the following description taken in connection with the accompanying illustrative drawings.

*Description of the preferred embodiments*

Figure 1:
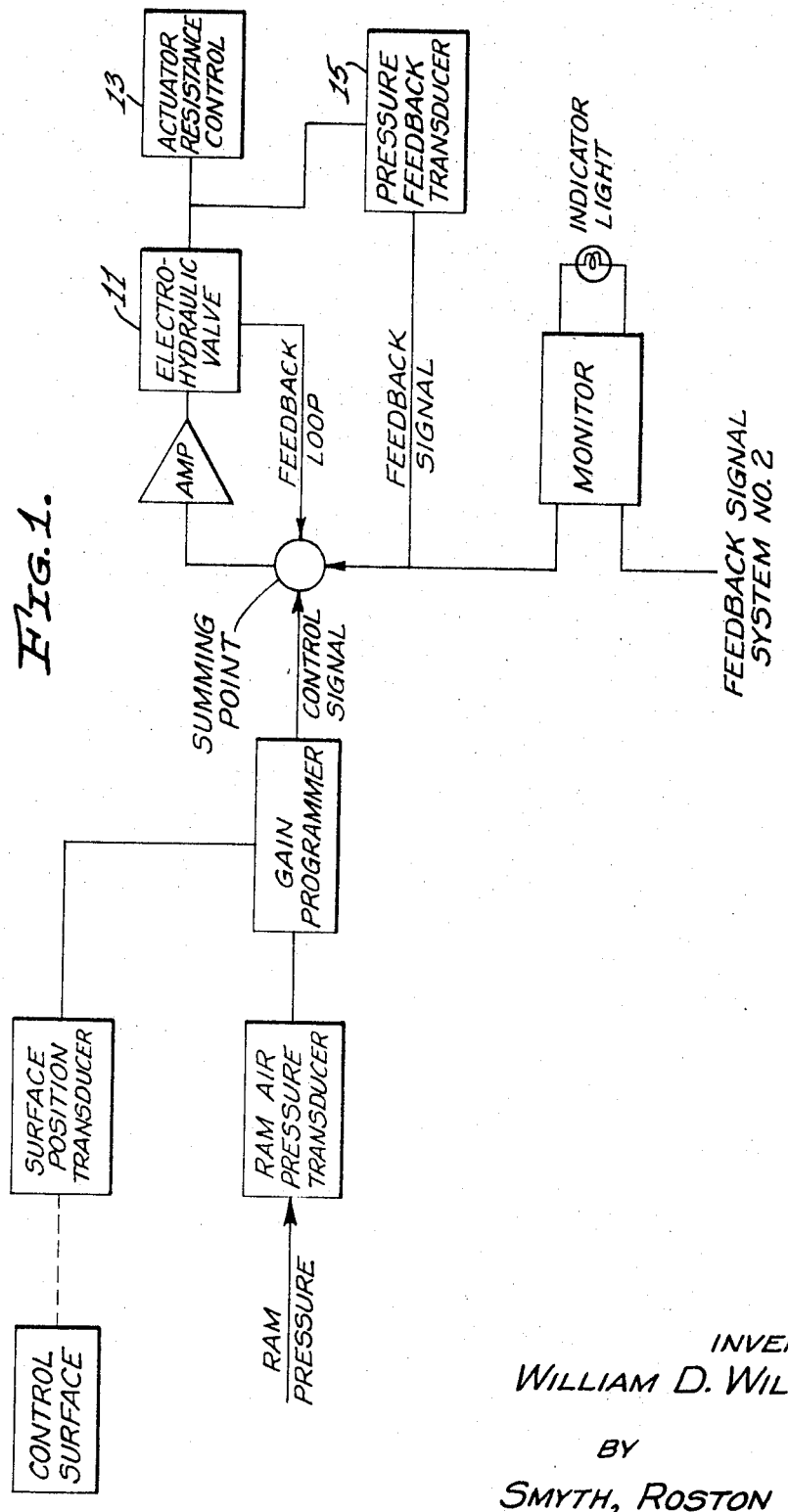
FIG. 1 is a schematic illustration of the load feel computer.

FIG. 1 of the drawing shows the present invention embodied in a load feel computer. The load feel computer includes a pressure transducer of the type that produces an electrical signal which is a function of the air speed of the aircraft. This can conveniently be accomplished by a pressure transducer of the type illustrated in FIG. 4 or a strain gauge pressure transducer of the type shown in FIG. 5 and described more particularly hereinafter, in which ram air pressure acts on the pressure transducer to produce the electrical signal. It is preferred to utilize a transducer that has an output voltage or signal that increases linearly as the air speed of the aircraft increases.

The block designated as a control surface in FIG. 1 represents diagrammatically any of the commonly utilized aircraft control surfaces, such as a stabilizer. These control surfaces are usually pivotally mounted so that the angular position thereof is variable.

The surface position transducer may be a conventional transducer of the type which can be arranged to produce an output voltage which is a function of the angular position of the control surface. Various types of transducers may be utilized; however, it is preferred to use a transducer that has a linear output.

The output from the surface position transducer and the pressure transducer are both fed to a gain programmer. The gain programmer includes a nonlinear network which combines the signals from the transducers nonlinearly and in accordance with a predetermined program. The network may be appropriately designed to duplicate virtually any nonlinear function required by the particular flight control. These nonlinearities may include gain limiting, gain changing, or even step functions of the output signal as a function of one, two, or more inputs. The gain programmer produces a particular control signal, depending upon the manner in which it is desired to vary the control signal in response to the signals from the ram air pressure transducer and the surface position transducer.

The control signal is fed to a summing point and serves as a reference signal in a feedback loop to be described next. The output of the summing point passes through another amplifier to the coils of an electrohydraulic valve. The electrohydraulic valve may be of conventional design and of the type which will regulate the pressure of the operating fluid supplied by it to an actuator resistance control in response to the control signal. In the embodiment illustrated, the electrohydraulic valve will make available a higher effective fluid pressure at the actuator resistance control in response to an increase in the control signal input thereto. It is preferred to provide a feedback loop from the coils of the electrohydraulic valve across the second amplifier back to the summing point. The actuator resistance control interposes a variable resistance to the operation of an actuator for a control surface. The resistance interposed by the actuator increases in response to the electrohydraulic valve supplying a higher fluid pressure to the actuator resistance control.

Figure 3:
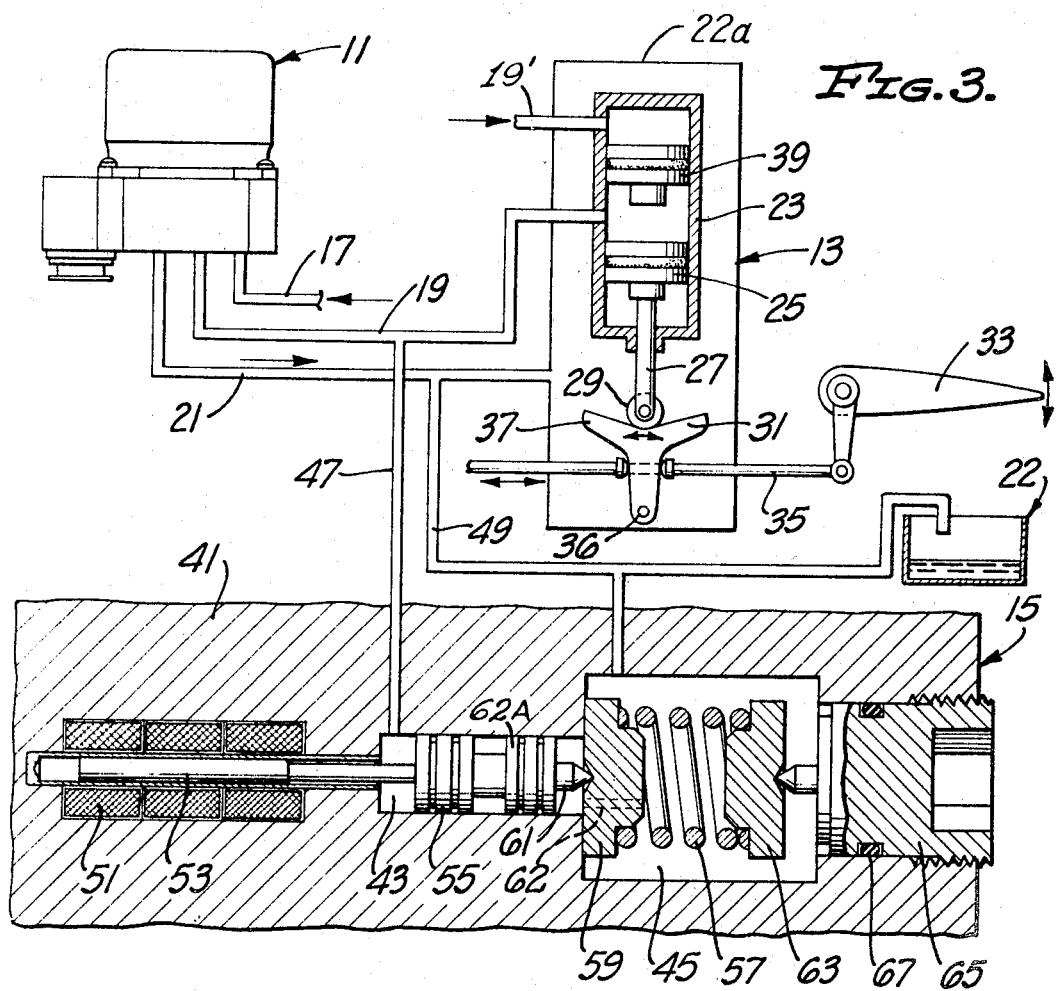
FIG. 3 is a schematic view partially in section of the electrohydraulic valve, the actuator resistance control, and the pressure feedback transducer.

To cancel the effect of variations in supply pressure of the operating fluid and generally to improve the accuracy of the system, a pressure feedback transducer is provided. Various types of pressure sensing mechanisms which produce a feedback signal in response to pressure may be employed. One such type of transducer is shown in FIG. 3. This transducer senses the differential between supply and return pressure to the actuator resistance control. The electrical feedback signal produced by the pressure feedback transducer is fed to the summing point as illustrated in FIG. 1, so as to close the feedback loop of this automatic pressure control system.

As a safety measure, it is preferred to provide two of the systems thus far described for each of the control surfaces. In order that the pilot may be advised if either of these systems fail, a monitor is provided which compares the feedback signals from the pressure feedback transducers of both of the systems and energizes an indicator, such as an indicator light, in the event of a failure in either system.

The two systems are preferably identical or substantially identical. The monitor senses the feedback signals from both of the systems and if the differences between such signals reaches a predetermined magnitude, the monitor indicates that a failure of one of the systems has occurred. A monitoring device which merely notes the absolute value of each feedback signal without comparing the two signals would not be satisfactory because under certain operating conditions relatively high feedback signals may be produced and such signals are not necessarily indicative of a failure of one of the systems. Rather, it is necessary to measure the difference between the magnitudes of the two feedback signals to ascertain whether or not one of the systems has failed.

The gain programmer, in general, combines several input signals in a manner which is representative of the influence of the individual conditions represented by the input signals are to exert on the control signal at any instant. More correctly, one should speak here of the degrees of influence, as at times one or another condition will dominate in the formation of the control signal ultimately controlling the actuator resistance control. The formation or generation of the control signal will thus depend on the desired degree of influence provided by a particular condition in relation to concurrently existing other conditions likewise required to provide some influence. Presently there are two conditions and they are the control surface position angle and the air speed.

Figure 2:
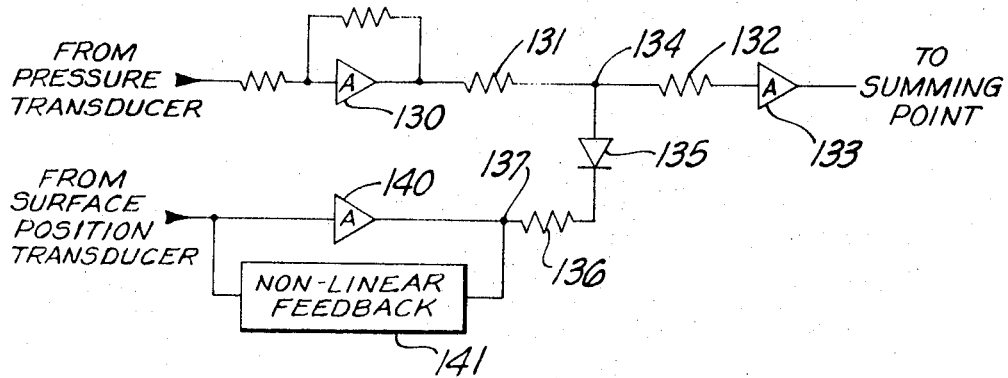
FIG. 2 illustrates somewhat schematically and partially as block diagram a representative example for the gain programmer as shown in FIG. 1.

The circuit as shown in FIG. 2 realizes a particular relationship between the speed of the aircraft and the existing position of a control surface. The relationship is plotted in FIG. 2a, wherein in particular the abscissa shows air speed and the ordinate shows the control signal to be fed to the summing point of the feedback loop as shown in FIG. 1. The parameter for the group of curves shown in FIG. 2a is the position angle of the control surface under consideration.

Figure 2A:
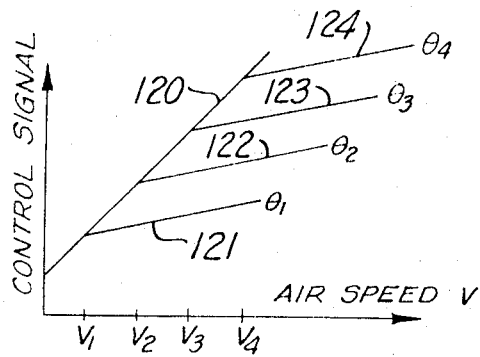
FIG. 2a is a graph showing the relationship between two inputs (air speed and control surface position) and the output of the circuit shown in FIG. 2.
Figure 2B:
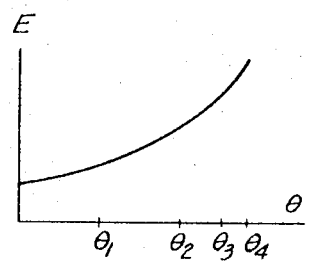
FIG. 2b is a graph illustrating the characteristics of one of the components employed in the circuit of FIG. 2.

Referring to the characteristics shown in FIG. 2a in particular, one can see that there is a main branch 120 establishing a substantially linear relationship between air speed and the control signal. This is established by substantial linear amplification of the pressure transducer output in an amplifier 130. The output of the amplifier 130 passes to one side of a resistor coupling network which includes resistors 131 and 132. The other side of this resistance network feeds another amplifier 133 which is the output amplifier of the gain programmer. The output of the amplifier 133 in turn feeds directly to the summing point shown in FIG. 1.

Figure 2C:
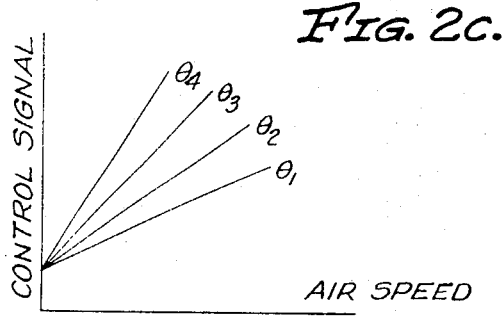
FIG. 2c is a graph showing a modified relationship between the desired control signal and the two inputs.

It can thus be seen that this circuit established by itself the characteristics 120. The junction 134 between resistors 131 and 132 receives another signal through a diode 135. Another resistor 136 is connected in series to the diode and provides a signal shunt path from junction 134 to the output of amplifier 140. This shunt path is effective only when diode 135 is conductive, which in turn depends upon a signal applied to the junction 137 between amplifier 140 and resistor 136. The signal E applied to junction 137 is depicted in FIGURE 2c and is a function of the control surface position angle $\theta$. An amplifier 140 receives the output of the surface position transducer in representation of the position $\theta$ of the control surface under consideration. A nonlinear feedback loop 141 for amplifier 140 establishes the characteristics depicted in FIG. 2c. It should be noted that this characteristic could be realized by a single diode in its range between full blocking and full condition. However, where greater accuracy is required, a more elaborate circuit, such as an amplifier with a nonlinear feedback, has to be provided. The details of such a network depend entirely upon the degree of accuracy and particularity of the characteristics, required temperature stability, etc. Nonlinear resistive networks of this type are well known and do not require elaboration. Suffice it to say that a single diode may in fact approximate at least such as desired characteristic.

Consider again FIG. 2a. For a given deflection or position angle $\theta$ of the control surface, say $\theta$, the control voltage will be in accordance with the characteristics 120 as long as the speed of the aircraft remains below, for example, speed value V1. In this case, the resulting output signal of amplifier 130 as effective at junction 134 is below the signal value E1 provided by amplifier 140 in accordance with the characteristics of FIG. 2c. One can see that as a result thereof the diode 135 will be cut off and the circuit branch leading to amplifier 140 through the resistor 136 is not effective.

When the air speed exceeds V1, diode 135 is rendered conductive and a portion of the signal current from amplifier 130 will not run through resistor 132 to amplifier 133 but will be bled off to amplifier 140 through the resistor 136. Accordingly, for higher speeds the control voltage will follow the flatter characteristics 121. How flat the characteristics will be depends on the divider ratio of the resistors 131 and 136. Upon selecting the resistor 136 considerably smaller than the resistor 131, the characteristics then provided may in effect be of the saturation type.

One can readily see that for larger position angles ($\theta2$, $\theta3$, $\theta4$, etc.) the signal E is larger to keep diode 135 cut off for correspondingly larger signal ranges as derived from amplifier 130 (up to speeds V2, V3, V4, etc.), so that the changeover from the characteristics 120 to a flatter characteristic such as 122, 123, 124, etc. occurs for these higher speed values V2, V3 and V4, respectively.

It will be appreciated that there is a double nonlinearity in the resulting overall characteristics. For any given surface position the control voltage-air speed characteristics is nonlinear with a particular slope change occurring when diode 135 changes from nonconduction to conduction (and vice versa). Additionally, that point of the slope change referenced against curve 120 as a whole is nonlinear in dependence upon the control circuit position in accordance with nonlinear characteristics shown in FIG. 2c.

Qualitatively, the resulting characteristics of FIG. 2a provide for a control voltage (input or output of amplifier 133) which increases with air speed in general. For small control surface position angles, the control voltage is kept low for air speeds above a rather low value, for example, value V1. For larger control surface position angles, for example, $\theta4$, the control voltage is allowed to increase steeply with speed at first and over a larger range of speeds (characteristics 120); and only for very large speeds further increase of the control voltage is severely retarded in accordance with a flatter characteristic.

FIG. 2c illustrates a different type of relationship. There are particular characteristics between control voltage and air speed for each different value $\theta$. These characteristics may be linear. This group of characteristics can be realized, for example, in that amplifier 140 (with or without nonlinear feedback 141 as required) controls the gain of amplifier 130 directly.

In summary, the gain programmer can be construed presently as a transmission means which has an input terminal to which is fed the ram pressure signal, an output terminal which feeds toward the summing point, and a control terminal which receives the surface position signal to control the transmission characteristics, for example, the gain of the transmission means.

FIG. 3 shows the electrohydraulic valve 11, the actuator resistance control 13, and the pressure feedback transducer 15. An inlet or supply conduit 17 leads from a supply of pressurized operating fluid (not shown) to the valve 11. The valve 11 supplies operating fluid through an output conduit 19 and regulates the pressure of the fluid so supplied in response to the control signal. A return conduit 21 extends from the valve 11 and the actuator resistance 13 to a reservoir 22.

Various types of actuator resistance controls may be utilized and the control 13 is illustrated merely by way of example. The control 13 includes a housing 22a and a cylinder 23 in the housing and having a piston 25 slidably mounted therein. A piston rod 27 is secured to the piston 25 and extends axially out of the cylinder 23. A roller 29 is secured to the outer end of the piston rod 27 and is in engagement with a cam 31. A control surface 33 is driven through an appropriate actuating linkage 35 which causes operation of power operated means (not shown) for moving the control surface 33. The linkage 35 and the power operated means are operative in response to movement of an actuator (not shown) in the cockpit of the aircraft. The cam 31 is pivotally mounted by a pin 36 and has a contour 37 which engages the roller 29 to cause axial movement of the piston 25 within the cylinder 23 as the cam is pivoted by the linkage 35. Thus, the force required to move the linkage 35 can be varied by varying the force applied to the cam 31 by the rod 27.

Some of the fluid supplied through the conduit 19 to the cylinder 23 will leak past the piston-cylinder interface and the piston rod-cylinder interface into the casing or housing 22A. This fluid will be supplied through the conduits 21 and 49 to the reservoir 22. This fluid, which is at return pressure, will also act on the lower end of the piston rod 27. The effective fluid force acting on the piston 25 is the difference between the supply pressure acting on the upper face of the piston 25 and the force of the return pressure acting on the lower face of the rod 27. It is apparent that the movement of the cam 31 will be resisted by this differential fluid pressure and that by increasing the pressure of the operating fluid on the upper side of the piston 25, the risistance to movement of the linkage 35 and the actuator in the cockpit is correspondingly increased. Thus, by increasing the control signal input to the valve 11, the valve is caused to increase the pressure of the fluid supplied to the upper side of the piston 25 and thereby increase the pressure differential between the supply conduit 19 and the return conduit 21. If the cam 31 is moved against this force to urge the piston 25 upwardly, some of the fluid thereabove will be forced back through the conduit 19 to the valve 11. The valve 11 will return this operating fluid through the conduit 21 and the conduit 49 to the reservoir 22.

The cylinder 23 also has a second piston 39 slidably mounted therein above the piston 25. Fluid under pressure from the second control system is applied to the upper side of the piston 39 from a line 19' corresponding to the line 19. Thus, should either of the control systems fail, the other is operative to resist the movement of the actuator 33.

The pressure feedback transducer 15 may include a body 41 having a supply chamber 43 and a return chamber 45 therein. A branch conduit 47 interconnects the supply conduit 19 and the supply chamber 43 and a branch conduit 49 interconnects the return conduit 21 and the return chamber 45.

A transducer coil 51 is also mounted in the body 41 in axial alignment with the chambers 43 and 45. A core 53 is mounted to slide variable distances into the coil 51. One end of the core 53 is secured to a piston 55 which is slidably mounted in the supply chamber 43. The operating fluid from the supply conduit 19 is fed through the branch conduit 47 to the supply chamber 43 and acts on one face of the piston 55 and tends to push the piston and the core 53 to the right as viewed in FIG. 3. Thus, the supply pressure of the operating fluid tends to move the core 53 out of the coil 51.

Such movement of the piston 55 and the core 53 is resisted by a coil spring 57 which acts through a plunger 59 in the return chamber 45 and a core extension 61 which engages the plunger 59. The plunger 59 has a port 62 extending therethrough through which the fluid at return pressure can pass and act on the right hand face of a piston 62A. The other end of the spring 57 seats on a retaining member 63 which in turn is supported by a plug 65 threadedly secured to the body 41 and sealed thereto by an annular seal 67. Movement of the piston 55 to the right is further resisted by the spring 57 and the fluid at return pressure acting on the piston 62A.

The feedback signal produced by the transducer 15 varies as the amount that the core 53 is extended into the coil 51 varies. It is apparent that the amount that the core 53 extends into the coil 51 is dependent upon and a function of the pressure differential in the conduits 47 and 49 which contain operating fluid at supply and return pressures, respectively.

Figure 4:
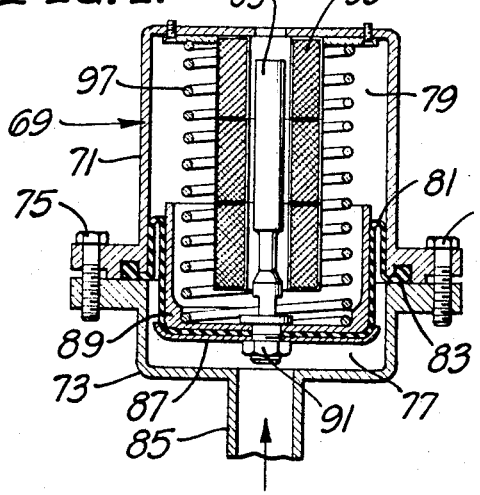
FIG. 4 is a longitudinal sectional view of one form of pressure transducer suitable for use with the present invention.

FIG. 4 illustrates a pressure transducer 69 which is suitable for use with the present invention. The pressure transducer 69 includes housing sections 71 and 73 interconnected by a pluraltiy of threaded fasteners 75. The resultant housing is divided into a pressure chamber 77 and a second chamber 79 by a flexible diaphragm 81 which has a peripheral sealing bead 83 which is operative to seal the housing sections 71 and 73 together. The housing section 73 has a ram air inlet 85 which is expected to ram air as the aircraft travels through the air. An outer plate member 87 and an inner cup-shaped member 89 are secured to the diaphragm 81 by threaded interconnecting means 91 which forms an extension of a core 93. The core 93 is disposed in the chamber 79 and is surrounded by a coil 95.

As the aircraft moves through the air, ram air pressure enters the pressure chamber 77 and tends to force the core 93 further into the coil 95. Such movement of the core 93 is resisted by a spring 97 which acts between an end wall of the housing section 71 and the cup-shaped member 89. Thus, the movable core 93 and the coil 95 function in the same manner as the coil 51 and the core 53 to produce an output signal that varies linearly with changes in air speed of the aircraft.

Figure 5:
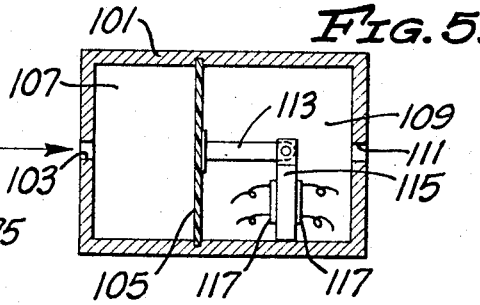
FIG. 5 is a semidiagrammatic sectional view of a preferred form of pressure transducer.

FIG. 5 shows a strain gauge type of transducer which, because of its simplicity, low weight and accuracy, is preferred for use with this invention. The strain gauge transducer may include a housing 101 having a ram air inlet 103. A diaphragm 105 divides the housing 101 into a pressure chamber 107 and a second chamber 109 which is maintained at ambient pressure. The chamber 109 is open to ambient air through a port 111.

The diaphragm 105 is flexible and moves in response to appropriate pressure variations between the chamber 107 and 109. An operating member 113 is secured to the diaphragm 105 for movement therewith and extends inwardly into the chamber 109. An appropriate beam 115 is rigidly affixed to the lower wall of the housing 101 at one end and is secured to the end of the member 113 at the other end thereof. Strain gauges 117 are deposited on the surfaces of the beam 115 and have appropriate electrical connections extending therefrom.

In operation of this transducer, ram air pressure is admitted through the opening 103 into the chamber 107. The pressure differential in the chambers 107 and 109 causes the diaphragm 105 to flex to the right as viewed in FIG. 5. Such movement of the diaphragm causes a corresponding increment of movement of the member 113, which in turn causes the beam 115 to bend in cantilever fashion about its rigid interconnection to the housing 105. Such bending of the beam 115 applies a force to the strain gauges 117 which operate in a conventional manner to produce an electrical signal which is a function of the ram air pressure and hence of the air speed of the aircraft.

The operation of the load feel computer described herein should now be apparent. The surface position transducer and the ram air pressure transducer feed electrical signals to the gain programmer. These signals are functions of the control surface position and ram air or air speed of the aircraft, respectively. The gain programmer combines these electrical signals in accordance with a predetermined program and produces a control signal which is a function of the two electrical signals which serve as inputs to the gain programmer.

The electrohydraulic valve operates in response to the control signal to supply fluid to the actuator resistance control. The pressure of this fluid supplied to the actuator resistance control varies in response to the changes in the control signal input to the electrohydraulic valve. Accordingly, the pressure of the fluid supplied to the cylinder 23 to act on the upper end of the piston 25 is accurately controlled, and therefore, the force acting through the rod 27 on the cam 31 and the linkage 35 is also accurately controlled. This permits accurate control of the resistance to movement of the actuator by the pilot. The feedback loop and the feedback signal from the pressure feedback transducer are provided to further improve the accuracy of the system. The monitor compares the feedback signals from the pressure feedback transducers of the two systems to ascertain when and if one of these systems fails. Oftentimes the control surface being controlled by the actuator is the same control surface which provides an input to the surface position transducer. It is apparent that if either the air speed or the control surface position is changed that the electrical signals supplied to the gain programmer, and hence the control signal, are correspondingly changed in the desired manner.

Although exemplary embodiments of the invention have been shown and described, it will be apparent to those having ordinary skill in the art that many changes, modifications and substitutions may be made without departing from the spirit and scope of this invention.

I claim:

1. In a system for varying the force required for operating an actuator for changing the position of a movable control surface on an airborne vehicle, the combination of:
   first and second control systems, each of said systems including first means for producing a first electrical signal variable in response to a first flight condition, second means for producing a second electrical signal variable in response to a second flight condition, and means responsive to said first and second electrical signals for producing an electrical control signal;
   resistance control means responsive to said control signals for varying the force required for operating the actuator, said resistance control means including means for producing a force to resist the operation of the actuator;
   each of said systems including feedback means responsive to said last mentioned force for producing an electrical feedback signal, said resistance control means also being responsive to said feedback signals, each of said control systems being operable to individually vary the forces required for operating the actuator; and
   monitor means for comparing the feedback signals from both of the control systems and indicating if one of the control systems fails.

2. A combination as defined in claim 1 wherein said second means includes a pressure transducer responsive to ram air pressure and said second flight condition is airspeed of the vehicle.

3. A combination as defined in claim 1 wherein the first flight condition is the position of one of the control surfaces of the airborne vehicle and said first means includes a surface position transducer for producing the first electrical signal in response to the position of said one control surface.

4. In a system for providing a controlled force on a movable member utilizing fluid under pressure wherein the force is variable in response to at least first and second variable conditions, the combination of:
   means for supplying fluid under pressure to the movable member to exert a force thereon with said force acting in a first direction;
   first and second control systems, each of said systems including first means for producing a first signal variable in response to the first variable condition, second means for producing a second signal variable in response to the second variable condition, means responsive to the fluid pressure acting on the movable member for producing a third signal, and means responsive to said first, second and third signals for producing a control signal;
   means responsive to said control signals for controlling the fluid under pressure supplied to the movable member to thereby influence the force applied by the fluid to the movable member; and
   monitor means for compairing the third signals from both of said control systems and indicating if one of the control systems fails.

5. A combination as defined in claim 4 including means for exposing the movable member to fluid at return pressure to apply a force to the movable member which generally opposes the force acting in said first direction, the third signal of each of said systems being responsive to both of the fluid pressures acting on the movable member.

6. In a system for providing a controlled force on a movable member, utilizing fluid under pressure wherein the force is variable in response to at least first and second variable conditions, the combination of:
   means for supplying fluid under pressure to the movable member to exert a force thereon;
   means for producing a first electrical signal variable in response to the first variable condition;
   means for producing a second electrical signal variable in response to the second variable condition;
   transmission means for amplifying the first electrical signal to provide a control signal, the transmission means having a first, substantially constant gain for variations of the first signal in a first range and a second gain different from said first gain for variations of the first signal in a second range;
   means responsive to the second electrical signal for controlling the change-over in the transmission means from the first gain to the second gain; and
   valve means responsive to said control signal for controlling the fluid under pressure supplied to the movable member to thereby control the force applied thereto by the fluid under pressure.

7. A combination as defined in claim 6 wherein said means responsive to the second signal includes means providing a shunt path for a portion of the first signal in the transmission means to be effective in dependance upon the second signal to thereby control the changeover from the first to the second gain in the transmission means.

8. In a load feel computer for use in an airplane having first and second movable control surfaces, the combination of:
   resistance control means including a movable fluid pressure responsive member for varying the force required to move said first control surface;
   means for supplying fluid under pressure to the movable member to exert a force thereon;
   means for producing a first signal variable in response to the position of the second control surface;
   means for producing a second signal variable in response to the airspeed of the airplane;

means for combining said first and second signals to produce a control signal; and valve means responsive to said control signal for controlling the fluid under pressure supplied to the movable member to thereby influence the force applied by the fluid to the movable member, whereby said load feel computer senses the position of the second control surface and provides resistance to movement of the first control surface.

References Cited

UNITED STATES PATENTS 2,890,673  6/1959  Chadwick _____ 244—76 X

FOREIGN PATENTS 800,958  9/1958  Great Britain.
803,575  10/1958  Great Britain.

FERGUS S. MIDDLETON, *Primary Examiner.*